United States Patent
Crockett et al.

(10) Patent No.: US 7,461,785 B2
(45) Date of Patent: Dec. 9, 2008

(54) ENHANCED PURCHASE VERIFICATION FOR SELF CHECKOUT SYSTEM

(75) Inventors: Timothy Wayne Crockett, Raleigh, NC (US); Phuc Ky Do, Morrisville, NC (US); Justin Monroe Pierce, Cary, NC (US)

(73) Assignee: Internatinal Business Machines Corporation, Armonk, NY (US)

( * ) Notice: Subject to any disclaimer, the term of this patent is extended or adjusted under 35 U.S.C. 154(b) by 0 days.

(21) Appl. No.: 11/952,844

(22) Filed: Dec. 7, 2007

(65) Prior Publication Data

US 2008/0078833 A1 Apr. 3, 2008

Related U.S. Application Data

(63) Continuation of application No. 11/020,979, filed on Dec. 22, 2004, now Pat. No. 7,325,729.

(51) Int. Cl.
*G06K 15/00* (2006.01)

(52) U.S. Cl. .................. 235/383; 235/491; 235/494; 235/472.02; 705/16; 705/23; 705/24; 186/61

(58) Field of Classification Search .............. 235/383, 235/491, 472.02, 494; 186/61
See application file for complete search history.

(56) References Cited

U.S. PATENT DOCUMENTS 5,641,039 A * 6/1997 Dumont ................... 186/61
2006/0261157 A1 * 11/2006 Ostrowski et al. .......... 235/383

* cited by examiner

*Primary Examiner*—Michael G. Lee
*Assistant Examiner*—Kristy A Haupt
(74) *Attorney, Agent, or Firm*—Mark E. McBurney; Dillon & Yudell LLP

(57) ABSTRACT

A system for enabling reliable verification of items being purchased using a self checkout system. The self checkout system is equipped with a verification mark dispenser and verification mark detectors that respectively dispenses a mark on an item as the item is being scanned for purchasing and then verifies, by detecting the mark on the item, that the item being bagged (or passed through the tunnel) is the same item that was scanned. When a customer scans an item for purchase, and if purchase transaction is successful, a mark (made of a non-reactive but detectable material or ink) is placed on the exterior packaging of the item. When the item is placed in the tunnel, the detector, sensitive to the activation of the specific marking and located at or in the tunnel, detects the marking on the item. If the activated marking is not detected by the detector, an alert condition is triggered.

14 Claims, 4 Drawing Sheets

ENHANCED PURCHASE VERIFICATION FOR SELF CHECKOUT SYSTEM

PRIORITY CLAIM

The present application is a continuation of U.S. patent application Ser. No. 11/020,979, titled "Enhanced Purchase Verification For Self Checkout System" filed on Dec. 22, 2004 now U.S. Pat. No. 7,325,729.

BACKGROUND OF THE INVENTION

1. Technical Field

The present invention relates generally to self checkout systems and in particular to security features of self checkout systems. Still more particularly, the present invention relates to a method and system for enhancing verification of products purchased with self checkout systems.

2. Description of the Related Art

Two primary goals in the labor intensive retail merchandiser and supermarket industries are (1) improving customer experience and (2) increasing profit margins by reducing overall (a) product costs and (b) labor costs. While product cost is a factor that is controlled by external forces, improving customer experience and reducing labor costs are controlled by the establishment themselves. With this in mind, one recent, major innovation within these industries has been the introduction of self-checkout systems. These self check-out systems replace and thus reduce the number of cashiers required while substantially reducing and in some cases eliminating the wait time for customer check out.

Several different types of self checkout systems have been developed, each requiring little or no direct customer supervision. It has been found, however, that some customers, realizing this lack of direct supervision (e.g., by a check-out clerk physically monitoring each purchase transaction) may undertake to scam/cheat the checkout system by bagging items not scanned for purchase, etc. Because of the tendency of some customers to cheat the system, several security measures have been introduced in the self checkout systems to reduce the likelihood that the items being bagged by the customer are not the actual items scanned for purchase.

For example, many checkout systems rely on an estimated weight of the product to determine if the product that has been bagged is the product that was that scanned. Thus, when a can of milk is scanned for purchase, the checkout computer provides an estimated weight of the can of milk, e.g., 6 ounces, and the change in the weight of the sack being utilized to bag the items is expected to reflect an approximate 6 ounce increase. One drawback of this method is that smaller items are often not able to change the weight of the sack and the computer assumes the item has not been bagged. Also, oftentimes the sack becomes full and the customer has to remove the sack to begin filling another sack. This removal, however, causes the computer to record an error event and holds up further purchasing of items.

To overcome the above issues with weighing bags of items, some self checkout systems are equipped with a tunnel through which the items are passed (on a conveyor belt) before arriving at the bagging area. While on the conveyor belt, the items is weighed and this weight relayed back to the computer, which verifies that the weight is the same as that of the item purchased. If the measured weight is within a predetermined tolerance of the weight listed for the product in the database, the item is transported to a bagging area and purchasing continues. However, if the weight of the product is not within the tolerance, the conveyor belt may be stopped and/or reversed, and the customer is requested to re-scan the product (see U.S. Pat. No. 4,676,343). Despite the apparent security of this system, customers occasionally outsmart the weight checking system by placing into the bag or on the conveyor belt a six ounce can of caviar valued at many times the price of a six ounce can of milk.

U.S. Pat. Nos. 4,676,343, 4,792,018, 5,340,970, and 6,497,362 present systems for operator-unattended checkout with particular concern for detection of customer fraud and deterrence thereof. Other proposals for improving security of these self-checkout systems includes verifying the purchased item visually or via redundant scanning of the item's UPC as the item travels inside the tunnel. However, such a verification mechanism is impractical, and presents a significant implementation challenge as well as substantial costs (bar code scanners, etc.). The solution is impractical because the bar codes will only be readable when passed directly over the verification scanner in the tunnel. Odd shaped items and/or items without a flat bottom/top surface on which the bar code is visible will not be able to be verified with this method. As is known in the art, scanning a UPC requires the item's UPC be placed directly over the scanner. Round items, for example cannot be verified with this method since the item cannot be positioned so that the UPC is in the correct position for scanning. Further, requesting the customer scan an item and then take the time to correctly position the item in the tunnel leads to longer self-checkout process and discourages customers from utilizing the self checkout systems.

What is needed is a cost effective and reliable method for verifying the items being bagged without the limitations of the above methods and without requiring the customer perform any other time intensive tasks that diminishes the customer's experience with the self-checkout systems.

SUMMARY OF THE INVENTION

Disclosed is a system for enabling cost effective and reliable verification of items being purchased using a self checkout system. The self checkout system is equipped with a verification mark dispenser and verification mark detectors that respectively dispenses a mark on an item as the item is being scanned for purchasing and then verifies, by detecting the mark on the item, that the item being bagged (or passed through the tunnel) is the same item that was scanned.

When a customer/consumer scans an item for purchase, the purchase transaction is processed and, if the item is successfully purchased (i.e., transaction confirmed), a mark (which may be made of a detectable material or ink or alternatively be a detectable radiation, such as infrared radiation) is placed on the exterior packaging of the item. When the item is placed in the tunnel, the detector, sensitive to the activation of the specific marking and located at or in the tunnel, detects the marking on the item. If the activated marking is not detected by the detector, an alert condition is triggered and an alert sent customer service personnel indicating that an un-purchased product is being placed in the customer's sack.

In one embodiment, the bar code label of the item is designed with a purchase verification strip that responds to some light-based trigger. This strip may be designed to be invisible to the human eye. When the bar code is scanned during item purchasing, the item is contemporaneously flashed with radiation (preferably an invisible range) that activates the strip/marking on the item being purchased. The radiation flash is generated by the POS (point-of-sale) scanner or may be generated by a different light source located adjacent to the POS scanner in the self checkout system. In one embodiment, the marking's activation fades over time. If an item is returned and then later purchased, the initial activation has faded and a new activation occurs when the item is scanned for purchase.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system for enabling cost effective and reliable verification of items being purchased using a self checkout system. The self checkout system is equipped with a verification mark dispenser and verification mark detectors that respectively dispenses a mark on an item as the item is being scanned for purchasing and then verifies, by detecting the mark on the item, that the item being bagged (or passed through the tunnel) is the same item that was scanned.

When a customer/consumer scans an item for purchase, the purchase transaction is processed and, if the item is successfully purchased (i.e., scan confirmed), a mark (made of a non-reactive but detectable material or ink) is placed on the exterior packaging of the item. When the item is placed in the tunnel, the detector, sensitive to the activation of the specific marking and located at or in the tunnel, detects the marking on the item. If the activated marking is not detected by the detector, an alert condition is triggered and an alert sent customer service personnel indicating that an un-purchased product is being placed in the customer's sack.

Figure 1A:
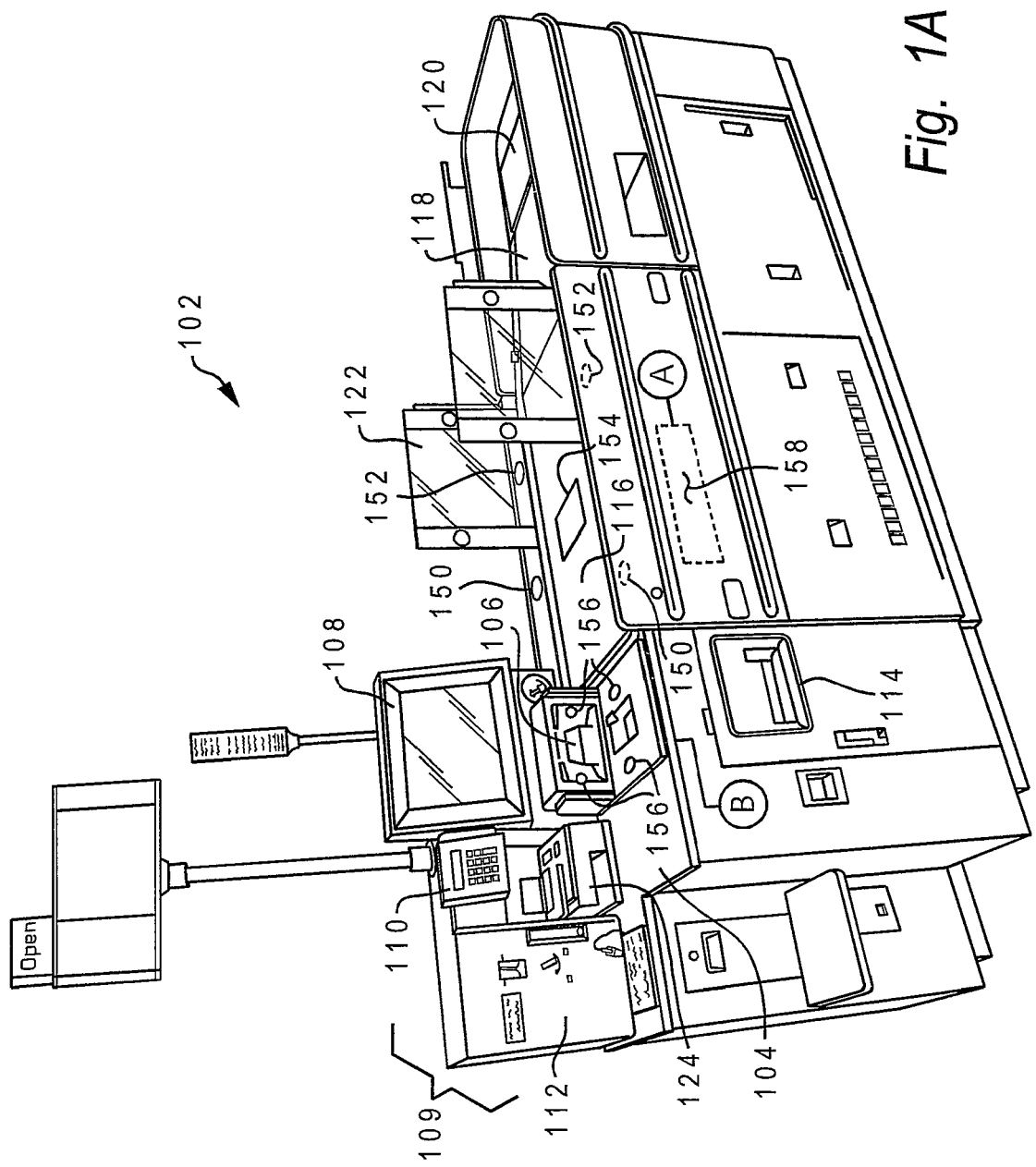
FIGS. 1A and 1B are block diagrams representing an exemplary self-checkout system equipped (within a retail environment) with a verification mark dispenser and verification mark detectors according to one embodiment of the invention.
Figure 1B:
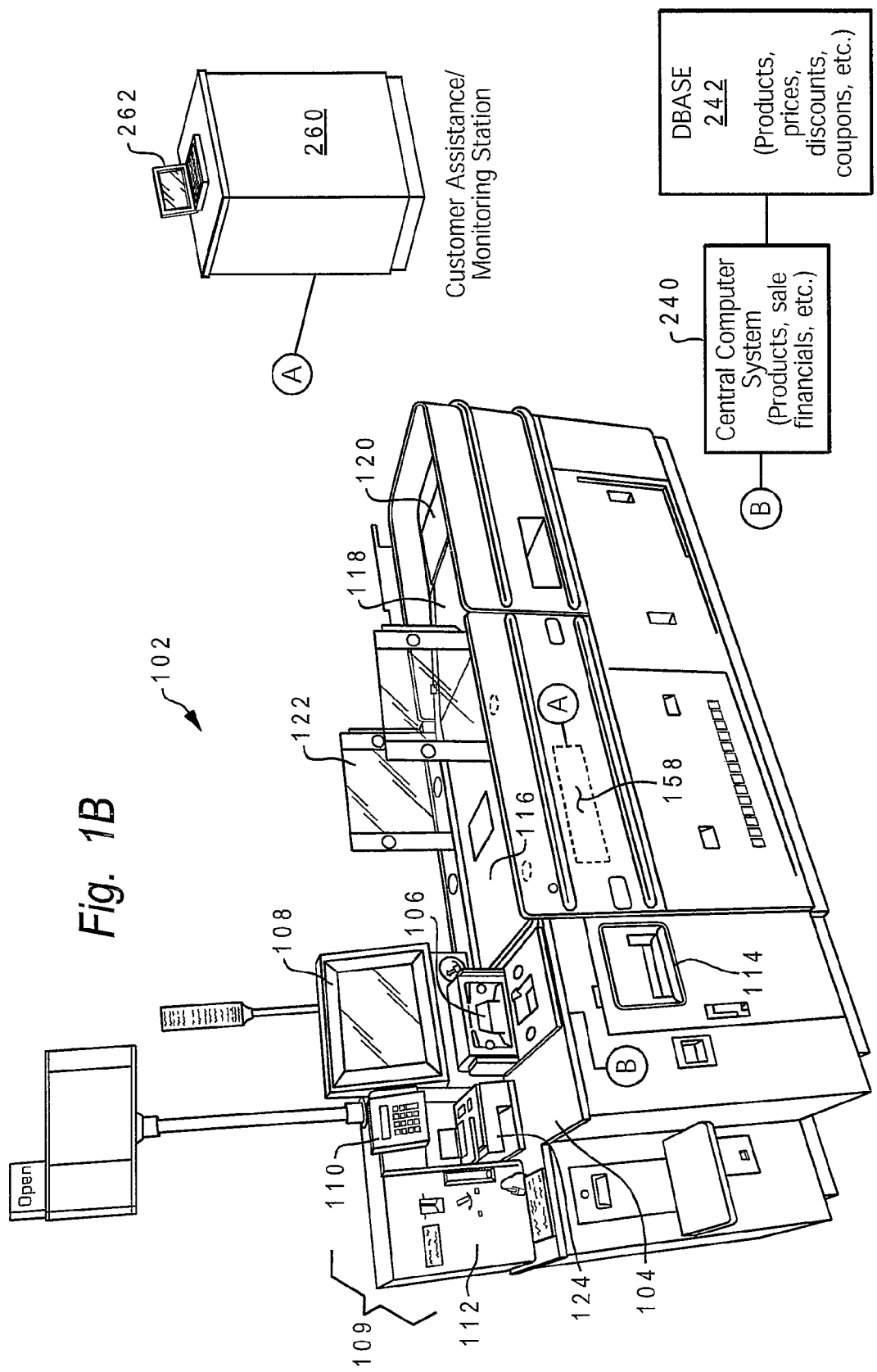

With reference now to the figures, and in particular FIG. 1, there is illustrated an exemplary embodiment of a self checkout system (and self-checkout system environment) within which the features of the invention are implemented. It should be noted that the various components and specific configuration provided by FIG. 1 is provided solely for illustration and not meant to imply any limitation on the actual self checkout system within which the features of the invention are applied/implemented.

FIG. 1 is a schematic diagram representation of an exemplary self-checkout system equipped with a verification mark dispenser and verification mark detectors according to one embodiment of the invention. Self-checkout system 102 comprises counter 104, universal product code (UPC) reader (or scanner) 106, and display screen 108 for interactive customer communication. Self-checkout system 102 further comprises payment mechanism 109, which includes credit card reader 110, cash acceptor 112, cash dispenser 114 and a receipt unit 124. Further, self-checkout system comprises an entry conveyor 116, an out-feed conveyor 118, a bagging area 120, and a tunnel 122.

One of skill in the art will appreciate that the self-checkout device may include, for example, a computer system which controls the overall operation of the self-checkout device. Such a computer system may include, for example, a processor, memory (RAM and/or ROM), data storage devices (CD, DVD, IDE hard drives, floppy drives, etc.), input devices (keyboard, microphone, trackpad, bar-code reader, UPC scanner, magnetic card reader, mouse, RF tag, touch screen and the like), audio system, and the like. The computer system may be in communication with one or more devices that together form the self-checkout system and/or self-checkout device.

One of skill in the art will also appreciate that the present invention may be used with any self-checkout device including a self-checkout lane having, for example, conveyor belts, stationary self-checkout systems, and any other self-checkout systems which generally include a register system and associated security devices.

The above described and illustrated self checkout system 102 may be utilized with a security system which uses the known weight of each item to help protect against consumer fraud. A weighing conveyor belt 154 is thus illustrated. Other security methods for preventing consumer fraud in a self checkout system may be used along with those provided by the present invention and described below.

Thus, in the larger retail environment, computer device of self checkout system 102 is connected/linked with a central computer system 240 (which represents a BOSS controller and a Point-Of-Sale (POS) Controller). Additionally, the verification mechanisms 158 of self checkout system 102 are linked to computer device 262 of customer assistant at monitoring station 260.

BOSS controller of central computer system 240 manages database 242, which includes information relating to the security aspects of the products: volume, weight, dimensions, and the like. POS controller manages the point of sale functions of the self check out (and other cashier operated) systems, and also manages the pricing database for product. Those skilled in the art are familiar with functionality of the BOSS and POS controllers.

Returning to FIG. 1, in addition to the above described components, self checkout system 102 further includes one or more verification mark dispensers (or activators, described below) 156 and one or more verification mark detectors 152. As described above, verification mark dispensers 156 are located adjacent/proximate to the UPC reader 106. Thus, whenever an item is brought near to the UPC reader 106 and the UPC of the item is scanned, the dispensers 156 dispense an invisible mark on the item (i.e., the exterior surface or packaging of the item).

In one embodiment, dispensers 156 mark the items with a light residue placed on the item by beaming/flashing the item with a special infrared or other light source that is detectable within a period of time after exposure thereto. The radiation applied to the item and emitted by the dispenser 156 may be any known wavelength, e.g., IR, UV, visible, so long as the detector 154 is able to later detect the exposure of the item to the specific wavelength. For example, if the dispenser 156 dispenses an infrared (IR) marking, the detector 154 will be able to detect exposure of an item to IR. It is noted that, depending on the marker material utilized, the wavelength emitted may differ from the one applied; However, the illustrative embodiment is described herein as providing a single, detectable wavelength, to enable easier understanding of the key functional features of the invention.

In another embodiment, the dispensers 156 mark the items with a special invisible ink that is sprayed on the exterior packaging of the item. Depending on the compound utilized to provide the marking, the marking may possibly be applied with an ink marker, spray can, tape, etc. In one embodiment, the product packing material and/or label are utilized as a marking material. Depending on the number and placement of dispensers 156, it possible to cover multiple surfaces of the item with the mark, particularly when the mark is one that requires a direct visual (to the detector 154) for verification. Thus, as with the illustrative embodiment, the marking may be placed on the package in more than one location. While not required with a radiation-type implementation, the flash of radiation may be applied in multiple locations on the item as well.

With either of the above embodiments, the light and/or ink marking fades over time to enable return and repurchase of the item. Thus, if an item is returned and then later purchased, the initial marking has faded and a new marking occurs when the item is scanned for purchase.

Figure 2:
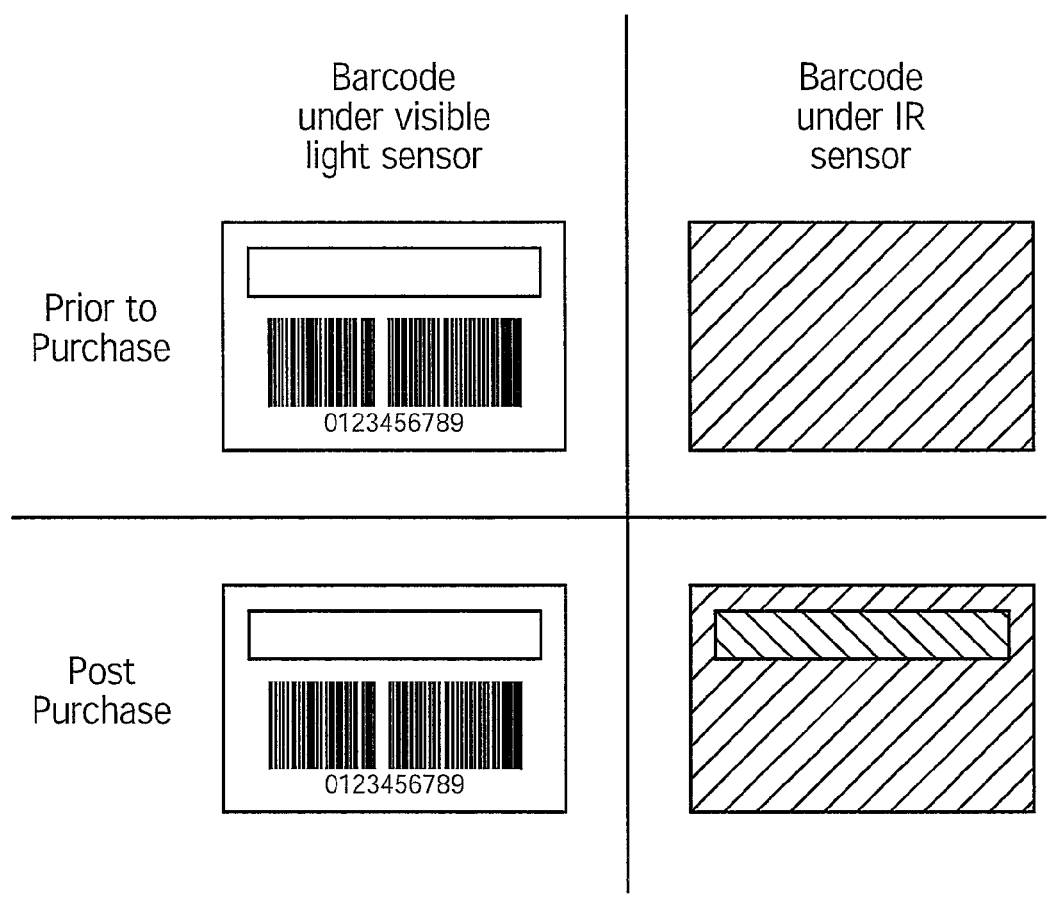
FIG. 2 illustrates exemplary bar code labels with verification markers included thereon as utilized within one embodiment of the present invention.

Reference to dispenser 156 as an activator covers a specific embodiment within which the dispenser activates a special mark on a bar code label. To understand the application of this embodiment, reference is made to the UPC labels of FIG. 2. FIG. 2 illustrates a table with exemplary bar code label utilized according to one embodiment of the invention. Two rows (A and B) and two columns (C and D) are show within the table of FIG. 2. Row A of FIG. 2 illustrates bar code label 200A prior to purchase of the item (i.e., before the bar code label is exposed to the UPC reader 106 and dispenser 156). Column C illustrates the bar code label under visible light sensor (detector) and column D illustrates bar code label under IR light sensor.

According to the illustrative embodiment, bar code label 200A of an item includes barcode (or UPC) 204 and verification strip 202A. Under visible light UPC labels 200A and 200B appear to be the same prior to purchase and post purchase. Also, prior to purchase, UPC label 200A (more specifically verification strip 202A) is visible under visible light sensor but invisible under IR sensor. Once the item has been purchased, however, and the UPC label 200B (verification strip 202B) exposed to dispenser 156 (and/or UPC reader 106, in an alternate embodiment described below), verification strip 202B is activated and appears as a visible strip under IR sensor.

Verification strip 202A is thus created within IR light-sensitive material that is triggered by the radiation generated by dispenser 156. When the bar code is scanned during item purchasing, the item is contemporaneously flashed with radiation (preferably an invisible range) that activates the strip/marking on the item being purchased. Notably, while described as visible under a visible light sensor, verification strip 202A may be designed to be invisible to the human eye.

In one embodiment, the radiation flash is generated by the POS scanner (enabled with two different radiation emitters), so that a separate dispenser is not required to activate verification strip 202A. Also, in one embodiment, the visibility of verification strip 202B post purchase under the IR sensor fades over time. Thus, if the item is returned and then later purchased, the initial activation has faded and a new activation of verification strip 202A occurs when the item is scanned for purchase.

Retuning now to FIG. 1, several different placements of detectors 150, 152 are illustrated, namely within or proximate to tunnel 122. The number and location of detectors 150, 152 depend on the dispensing mechanism and/or type of mark being utilized. The more dispensers utilized, the less the number of detectors required since more of the items surface area is marked, making the mark easier to detect. When the dispenser 156 generates an IR marking, a single IR detector may be utilized to determine when the item has been exposed to IR light. The IR detector is selected based on a consideration of the emitted radiation, which, as previously mentioned, may differ from the radiation applied. The IR detector may be placed at any location within the tunnel 122. This single detector configuration also applies for other unique radiation types/marks that may be detected without a direct visual line to the detector.

When the detector activates a verification strip 202B on a UPC label, the single detector is replaced with multiple detectors placed so as to cover as much of the external surface area of the item as possible to obtain a visual of the verification strip 202B. Similarly, multiple detectors 150, 152 placed at different locations may be required for a special ink mark placed on the item.

Figure 3:
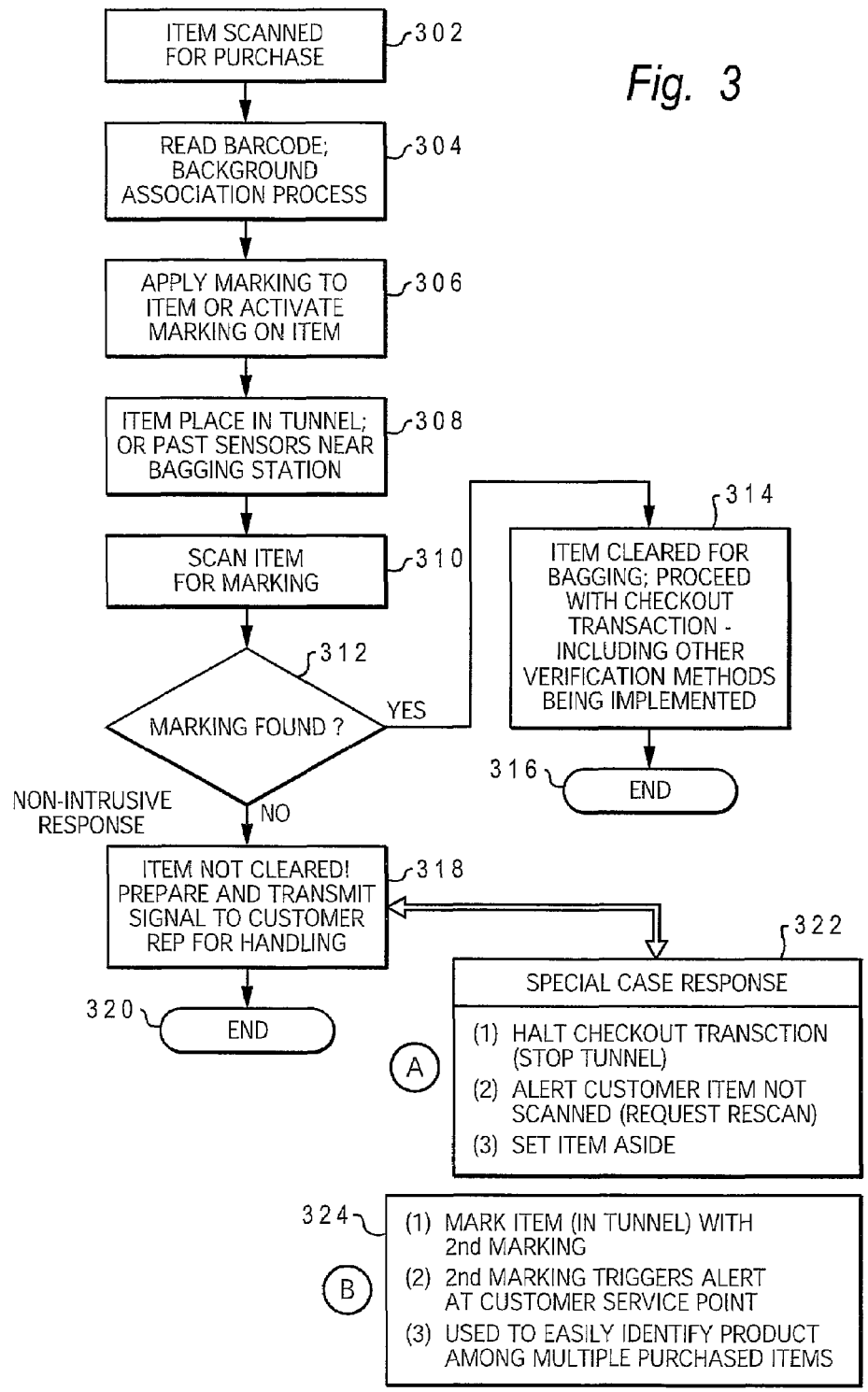
FIG. 3 is a flow chart of the process of by which the self-checkout and purchase item verification scheme is completed utilizing the self-checkout system of FIG. 1 according to one embodiment of the invention.

FIG. 3 illustrates an example flowchart of the process by which an item is purchased and then verified using a self-service checkout system designed similarly to FIG. 1A, according to one embodiment of the present invention. The process begins at block 302 at which the item is scanned for purchase. A check is made at block 304 whether the barcode was accepted and the purchase approved by the background computer. Assuming that the bar code is correctly scanned and the purchase transaction approved, the verification marking/activation process is initiated as shown block 306. This process applies the mark to the item and/or the verification strip on the bar code label is activated. Then, at block 308 the purchased item is placed in the tunnel, where the item is made to pass various mark detectors/sensors. The detectors checks the item for the particular mark or activated verification strip at block 310, and a determination made at block 312 whether the mark was found on the item.

If the verification mark is detected, the item is cleared for bagging and the checkout transactions allowed to proceed, as shown that block 314. Notably, other verification methods may also be applied to the items, including verifying the weight of the item, etc. Once the item is verified as being the one purchased, then, the process ends at block 316. Returning to decision block 312, if the verification mark is not detected on the item as it passes through the tunnel, the verification records a problem, and an alert signal is generated and transmitted to the customer representative, as depicted at block 318.

Figure inserts A and B provide two special case handling of the above described process. In case A 322, when the item is not verified, the checkout transaction is halted and the customer is alerted that the item was not properly scanned. An audible or visible output may be provided to the customer, informing the customer that the product placed on the conveyor belt was not "properly" scanned. This gives the customer an opportunity to correct the error. Also, the item may be set aside via some secondary conveyance system.

For case B 324, the item is marked with a second marking within the tunnel. This may require a second dispenser be placed within the tunnel. This second mark triggers an alert at the customer service point. In one embodiment, the second mark is a visible mark that makes the un-purchased/un-verified item easy to identify within the sack of items. The second dispenser may, however, be replaced with a more advanced system whereby the presence of an un-verified items triggers an alarm at the customer service desk and captures and transmits a picture or other identifying mark of the item.

Several benefits are provided by the application of the features of the invention. Key among these are that the verification steps (performed by the detector does not require any interpretation or focused viewing as is required by the proposed barcode verification methods. That is, the marking only needs to be exposed to the detector for verification. Also, the active marking may be simple to detect with established technology. The marking utilized is suitable for a wide variety of products and is less prone to failure since it cannot be manipulated by the customer. Since the marking is invisible, the customer does not need to be aware of the new security precaution, making it easier to outthink those customers who may wish to cheat the system by substituting purchased products with different bagged products.

Finally, the verification features of the invention may be easily merged with or into existing verification methods (i.e., it may be added on to existing self checkout systems with little effort). Thus, the other less sophisticated verification methods (e.g., checking the weight of items) may be utilized in conjunction with the method of the present invention.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A self checkout system comprising:
   a point of sale (POS) scanner for reading a UPC of an item being purchased by a customer;
   a dispenser for marking the item with a special mark;
   verification mechanism for using said special mark to determine when an item being taken by the customer is not the item that was purchased by the customer;
   a second dispenser, located at a point of verification for the first special mark, that emits a second special mark that is detectable by customer assistance personnel; and
   alert notification logic for placing a visibly detectable second mark on the item that alerts the customer assistance personnel of the presence of the item that was not verified when the customer passes a pre-established check point monitored by the customer assistance personnel.

2. The self-checkout system of claim 1, further comprising alert notification logic that signals when an item being taken by the customer has not been purchased.

3. The self-checkout system of claim 2, wherein said signal includes one or more of:
   alerting a customer assistance personnel that the item has not been purchased;
   alerting the customer that the item has not been purchased;
   stopping the purchase transaction from completing until the item is verifiably removed; and
   requesting the customer contact customer assistance personnel to resolve a problem.

4. The self-checkout system of claim 1, further comprising logic for enabling said dispenser to dispense said special mark contemporaneously with a scanning and acknowledgement of the item's purchase by the POS.

5. The self checkout system of claim 1, further comprising:
   a tunnel through which all items must passed during a purchase transaction; and
   wherein said verification mechanism is disposed within said tunnel and detects said mark on purchased items while said items passes through said tunnel.

6. The self-checkout system of claim 1, wherein said verification mechanism further comprises at least one sensor capable of detecting the special mark, wherein when detection of the mark requires a line-of-sight detection, multiple sensors are provided at different spatial locations to enable coverage of each angle at which the special mark maybe aligned relative to the item.

7. The self checkout system of claim 1, wherein said dispenser dispenses a residue of invisible light radiation on the item by beaming/flashing radiation on the item, wherein the residue is detectable by a detector of the verification mechanisms within a period of time after exposure of the item to the residue.

8. A self-checkout system comprising:
   a point of sale (POS) scanner for reading a UPC of an item being purchased by a customer;
   a dispenser for marking the item with a special mark;
   verification mechanism for using said special mark to determine when an item being taken by the customer is not the item that was purchased by the customer;
   wherein said dispenser dispenses a residue of invisible light radiation on the item by beaming/flashing radiation on the item, wherein the residue is detectable by a detector of the verification mechanisms within a period of time after exposure of the item to the residue.

9. The self-checkout system of claim 8, further comprising alert notification logic that signals when an item being taken by the customer has not been purchased.

10. The self-checkout system of claim 9, wherein said signal includes one or more of:
    alerting a customer assistance personnel that the item has not been purchased;
    alerting the customer that the item has not been purchased;
    stopping the purchase transaction from completing until the item is verifiably removed; and
    requesting the customer contact customer assistance personnel to resolve a problem.

11. The self-checkout system of claim 8, further comprising logic for enabling said dispenser to dispense said special mark contemporaneously with a scanning and acknowledgement of the item's purchase by the POS.

12. The self checkout system of claim 8, further comprising:
    a tunnel through which all items must passed during a purchase transaction; and
    wherein said verification mechanism is disposed within said tunnel and detects said mark on purchased items while said purchased items passes through said tunnel.

13. The self-checkout system of claim 8, wherein said verification mechanism further comprises at least one sensor capable of detecting the special mark, wherein when detection of the mark requires a line-of-sight detection, multiple sensors are provided at different spatial locations to enable coverage of each angle at which the special mark maybe aligned relative to the item.

14. The self checkout system of claim 8, further comprising:

a second dispenser, located at a point of verification for the first special mark, that emits a second special mark that is detectable by customer assistance personnel; and alert notification logic for placing a visibly detectable second mark on the item that alerts the customer assistance personnel of the presence of the item that was not verified when the customer passes a pre-established check point monitored by the customer assistance personnel.

* * * * *